United States Patent [19]

Milosavich

[11] 3,862,350

[45] Jan. 21, 1975

[54] RADIO FREQUENCY INTERFERENCE SHIELDING

[75] Inventor: Bernard S. Milosavich, Baltimore, Md.

[73] Assignee: The Singer Company, Inc., New York, N.Y.

[22] Filed: Oct. 3, 1973

[21] Appl. No.: 402,999

[52] U.S. Cl. ........................... 174/35 R, 304/172.5
[51] Int. Cl. ........................................... H05k 9/00
[58] Field of Search......... 174/35 R, 35 MS, 35 SM; 340/172.5

*Primary Examiner*—Darrell L. Clay
*Attorney, Agent, or Firm*—William Grobman; James C. Kesterson

[57] ABSTRACT

This disclosure illustrates and describes an apparatus and a method for preventing the interference by strong electrical fields with the operation of electronic equipment. There are many situations where a substantial amount of electronic equipment is located in an area which is subjected to strong radiation fields. One example of such a situation is the installation of an aircraft simulator at an air base which utilizes high powered radio transmitters and radar transmission equipment. Interference in the operation of the electronic equipment by the radiant fields may cause improper operation of digital computers, damaging transient effects and complete disruption of intercomponent communication. This invention is used where such equipment is mounted upon a raised floor and in which the cables interconnecting the electronic components pass beneath the raised floor. In accordance with this invention the raised floor is constructed upon a sheet of highly conductive material which is then folded up around the sides and the ends of the raised floor and electrically grounded thereto so that the floor, the sheet of conductive material, and the cabinets containing the electronic gear thereon are connected together and completely surround the electrical equipment and the connecting cables.

5 Claims, 5 Drawing Figures

RADIO FREQUENCY INTERFERENCE SHIELDING

RELATED APPLICATIONS

The subject matter of this invention is related to the subject matter of the copending patent application Ser. No. 373,754 filed on June 26, 1973 in the name of Herman T. Caudill and entitled Apparatus for sheilding against Electromagnetic Interference.

BACKGROUND OF THE INVENTION

1. Field of the Invention

This invention relates to electrical equipment, and more particularly, to shielding for electrical equipment to prevent interference from external electrical fields.

Cross-talk has been one of the major problems in communication systems for many years. This is particularly true where the strength of the signals within the communication system is low. In addition, interference from outside sources of electromagnetic energy are a particular hazard where the equipment is situated in close proximity to strong electromagnetic field generators. One example of the type of location which is particularly vulnerable to E—M (Electromagnetic) interference is a military installation where high-powered radio and radar apparatus may readily interfere with such equipment. Another type of location is the installation of communication and similar equipment in an electrical power generating station where strong E–M fields may cause grave interference with all communication systems.

2. Description of the Prior Art

One of the earliest forms of devices for reducing interference from external radiation fields was the use of a screen cage. The low power communication equipment was contained within a room which was constructed of copper screening in addition to any other construction material used. The screening was grounded, and care was taken to provide conductive paths between the walls and all doors and similar openings. This type of room provided adequate protection where it was feasible to build such a structure. However, as the power of generating systems—both radio and power systems—grew in size, the effectiveness of the screen room decreased. In systems which utilize computers for control purposes, the equipment very often is included in a plurality of separate cabinets. While it may be feasible to place the entire control system including the computer in a screen room, it is not feasible or economical to build a separate screen room around each cabinet. In situations of this nature, even if the entire system is contained in a screen room, there is often interference from one part of the equipment or system with another. Therefore, it is important to provide complete protection from radiant fields.

In order to overcome some of these problems, the prior art provided shielded cables, grounded cabinets, and means for connecting the cable shields and the cabinets together. However, there was still a problem whenever a cable penetrated a cabinet. At the point where the cable entered the cabinet, the perforation provided was a potential source of E-M interference leakage. Elaborate structures were developed to overcome this problem.

SUMMARY OF THE INVENTION

This invention comprises a simple apparatus and method for completely enclosing all of the vulnerable components of electronic apparatus and for shielding the communication lines which interconnect the various components of that equipment.

It is an object of this invention to provide a new and improved electrical structure.

It is another object of this invention to provide a new and improved structure for shielding electrical equipment.

It is a further object of this invention to provide a new and improved apparatus for preserving electromagnetic shielding integrity in electronic equipment.

Additional objects and advantages of this invention will become more apparent as the following description proceeds, which description should be considered together with the accompanying drawings.

DESCRIPTION OF THE PREFERRED EMBODIMENT

Figure 1:
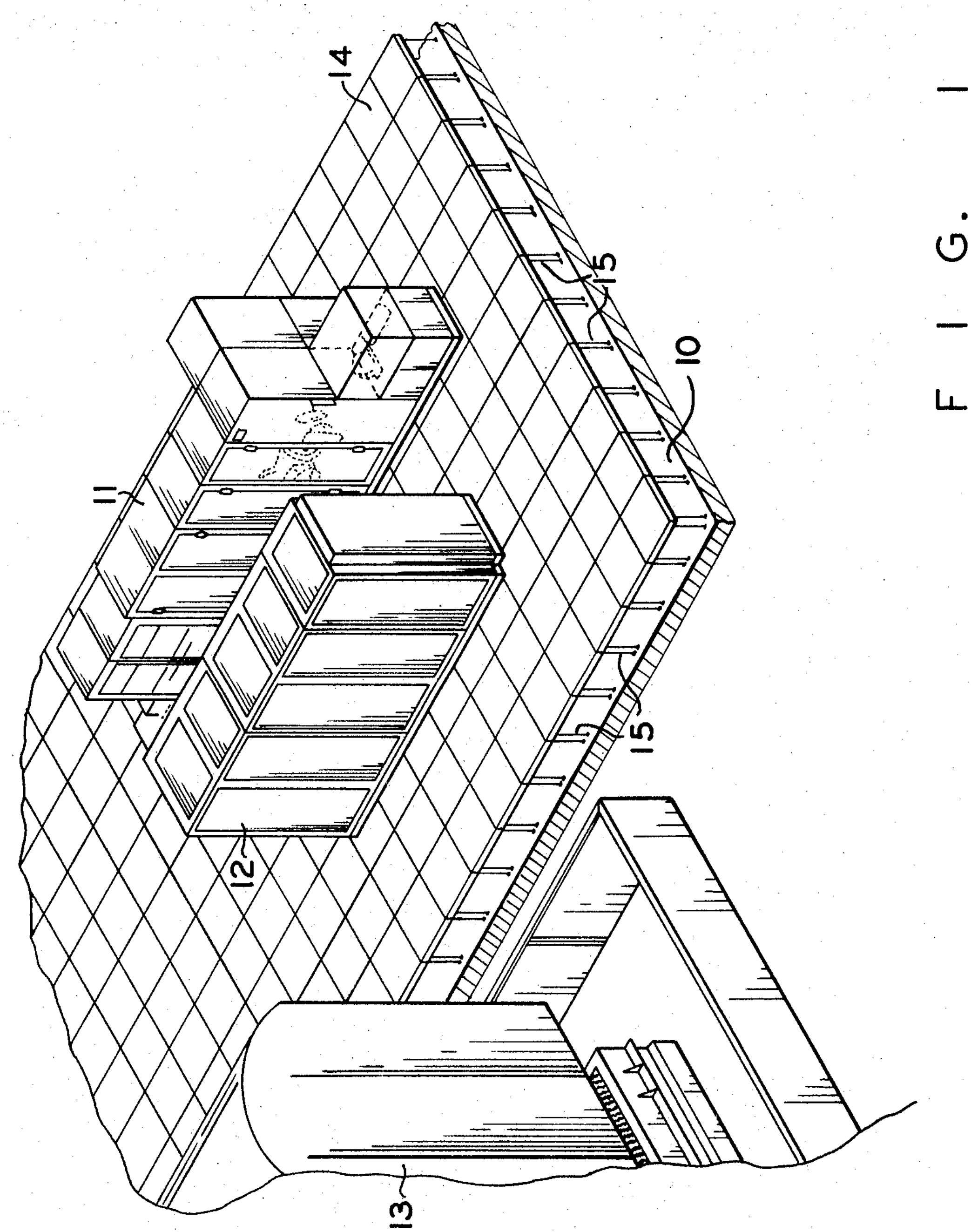
FIG. 1 is a pictorial illustration of some electronic equipment.

Referring now to the drawings in detail and more particularly to FIG. 1, the reference character 11 designates cabinet structures which contain electronic equipment. Additional cabinets 12 may contain electronic equipment or digital computers, and 13 is a portion of a utilizing structure. The cabinets 11 and 12 are mounted on a supporting platform formed of a plurality of square blocks 14 which are raised above the floor 10 by means of legs 15 which terminate in feet 16.

The structure shown in FIG. 1 is a common method of construction for the installation of electronic equipment. The separate units 11, 12 and 13 operate together to accomplish the desired results. In order to operate properly the three major sections 11, 12 and 13 shown in FIG. 1 must be interconnected by suitable communication cables. No such cables are shown in FIG. 1 because it is customary to run those cables through the bottoms of the cabinets 11 and 12 and under the supporting platform formed of a plurality of square blocks 14. By this means a neat appearance is achieved, the cabling is out of sight and it is protected by the supporting platform formed of a plurality of square blocks 14 against accidental damage. When an installation of the type shown in FIG. 1 is to be made in a location where strong electromagnetic radio fields exist, serious problems in the operation of the equipment are created by the induction of unwanted signals and transients into the cables connecting the cabinets 11, 12 and 13. The cables are particularly vulnerable to induced potentials whenever the cable shielding is broken. In addition, the equipment within the cabinets 11, 12 and 13 also are subjected to induced potentials wherever an opening appears in the cabinet structure. Thus, a major problem in an installation of this type is the sealing against the intrusion of electromagnetic energy into the openings made in the shielding cabinet structures for the passage of the communication cables therethrough. In order to avoid the problems caused by such electromagnetic interference, elaborate and expensive precautions have been taken in the past.

Figures 2, 3, 4, 5:
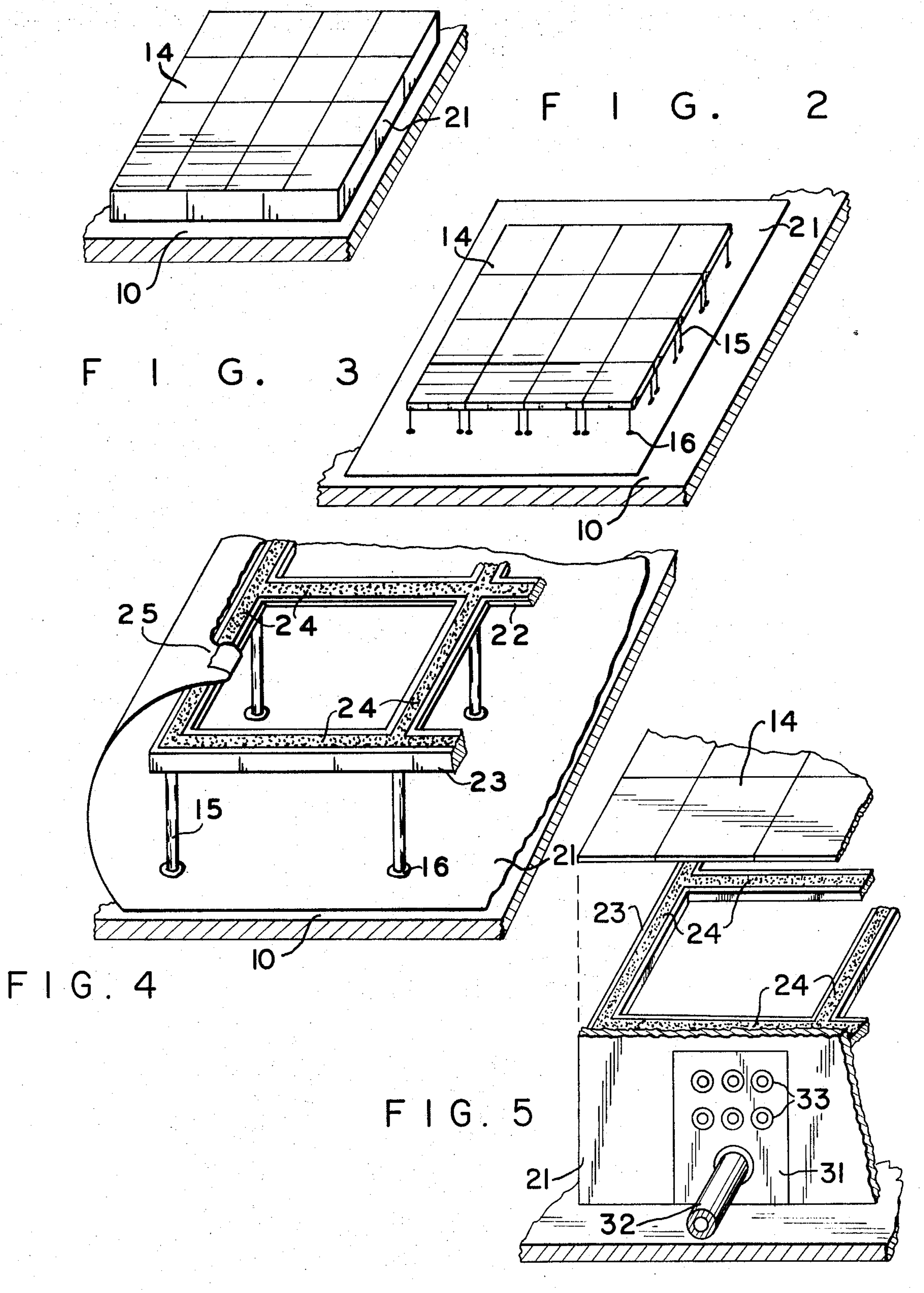
FIG. 2 is a perspective sketch of a portion of the supporting structure of FIG. 1 fully enclosed.
FIG. 3 is a perspective schematic sketch of an earlier stage of the supporting structure shown in FIG. 2.
FIG. 4 is a perspective view of a small portion of the supporting structure of FIGS. 1, 2 and 3 enlarged to show details thereof.
FIG. 5 is a perspective view of a portion of the structure of FIG. 2 showing a connection panel therein.

This invention contemplates the enclosing of the space beneath the supporting platform 14 completely by conductive material 21 as shown in FIG. 2. In other words, the supporting platform 14 is constructed on top of a sheet of highly conductive material in the manner shown in FIG. 3. When the construction of the apparatus is completed, the portion of the conductive sheet material 21 which extends beyond the supporting platform 14 is folded up and around the platform 14 and is electrically connected thereto. All openings are sealed in the sheet material 21, and the space beneath the platform 14 is completely enclosed in a highly conductive package. A portion of the final result is shown in FIG. 2.

FIG. 4 illustrates how a portion of the sheet material 21 is used to enclose the platform 14. Each of the blocks 14 usually comprises a metal frame formed of an outer edge angle member 23 and inner supports 22. The legs 15 with the circular feet 16 on the ends thereof are attached to the underside of the members 22 and 23. Normally, the metal frame shown in FIG. 4 may be covered by a flooring material such as linoleum mounted on a reinforced steel sheet. This flooring material is removed from those squares 14 which are around the outer periphery of the supporting structure, and a conductive gasket material 24 is attached to the top surface of the frame members 22 and 23. Then the sheet material 21 is brought up the sides of the structure to completely cover the legs 15 and the feet 16, and the sheet material is laid over the top of the frame members 22 and 23 with its conductive surface in contact with the conductive gasket material 24. The floor covering may then be replaced on the frame members 22 and 23 on top of that portion of the sheet material 21 which overlies the frame to form a solid enclosed package which is both structurally sound and electrically conductive. The frames of the individual squares 14 should be electrically connected together, and the flooring material on the top surface thereof should be of an electrically conductive material.

Because it is often necessary to penetrate the closed package described above in order to supply electrical energy to the system and to provide connections to the cables which lie under the supporting platform 14, the closed package shown in FIG. 2 may be provided with one or more connection panels such as that shown in FIG. 5. The panel 31 is a metal structure which is firmly attached by conventional means to the frame member 23 of the supporting platform 14. An electrically conductive conduit 32 which is grounded to sheet 21, may be used to penetrate the panel 31 so that the radio frequency interference protection is maintained since any electrical cable entering or leaving the closed package described above will pass through the electrically conductive conduit 32. In addition, suitably shielded connectors 33 may be mounted on the panel member 31 so that additional cables may be plugged and unplugged to provide communications access to the equipment. Connectors which are designed to prevent radio frequency interference are not new, are not the subject of this invention, and will not be described in detail herein.

It is contemplated that the sheet material 21 can be comprised of any of several materials or forms. One example of a strong sheet material which will withstand a substantial amount of punishment and hard treatment and accomplish the purpose of this invention is a metalized synthetic resin in sheet form such as those known as "Mylar," polyvinyl chloride, and conductive rubber. Sheet metal may also be used, and there are some situations in which a metal screening will serve the purpose. These are but examples of materials which might be used for the sheet material 21. What particular material is used depends upon the requirements of the particular situation.

If a metalized synthetic resin is used, then the sheet material 21 is arranged on the ground with its metalized, conductive surface facing toward the floor 14. The feet 16 of the legs 15 rest upon the conductive surface itself, and when the sheet material 21 is folded up and over the top of the edge of the flooring 14 as shown in FIG. 4, it may be provided with tabs 25 for attachment to the frame members 22 and 23. Any suitable form of attachment, such as by bolting to the frame members 22 and 23, will provide additional electrical contact between the conductive portion of the sheet 21 and the conductive gasket material 24. When the entire unit has been assembled, the sheet material 21, the floor 14 and the cabinet structures 11 and 12 should comprise a unitary casing which is impervious to penetration by electromagnetic radiant energy.

The above specification has described a new and improved apparatus and method for providing electromagnetic interference protection to electronic components. It is realized that the above description may indicate to those skilled in the art additional ways in which this invention may be used without departing from its spirit. It is, therefore, intended that this invention be limited only by the scope of the appended claims.

What is claimed:

1. Apparatus providing electromagnetic interference protection to electrical equipment, said apparatus comprising an electrically conductive supporting platform which supports said electrical equipment thereon, means holding said supporting platform in spaced relation from a base, means interconnecting separate components of said electrical equipment, said interconnecting means passing between said base and said supporting platform, a sheet of conductive material interposed between said base and said supporting platform completely surrounding the space therebetween, and means electrically connecting said sheet, said supporting platform and said electrical equipment together.

2. In an electrical system where electrical equipment is mounted in electrically conductive cabinets which are supported on a raised conducting platform and in which system electrical conductors connecting the cabinets together pass under said platform, apparatus for protecting said electrical equipment from electromagnetic interference, said apparatus comprising a sheet of flexible electrically conductive material arranged below said conductors and said platform, said sheet being folded along to enclose the space below said platform and form a conductive enclosure with the platform as the top and containing said conductors, and means for electrically connecting said sheet to said platform to provide an electrically shielded enclosure for said electrical conductors.

3. The system defined in claim 2 further including shielded means penetrating said sheet for providing electrical communication with the interior of said space surrounded by said sheet and said raised platform.

4. The system defined in claim 3 wherein said means penetrating said sheet includes a terminal panel which includes means for electrically connecting said terminal panel to said sheet to insure the integrity of said shielding effect.

5. The system in claim 3 wherein said means for electrically connecting said sheet to said raised platform includes conductive gasket material interposed between a conductive surface of said sheet and a conductive surface of said raised platform.

* * * * *